US006053534A

United States Patent [19]

Timmerman

[11] Patent Number: 6,053,534

[45] Date of Patent: Apr. 25, 2000

[54] INFLATABLE EVACUATION SHUTTLE

[76] Inventor: Francy Diane Timmerman, 2701 N. Lafayette, Bremerton, Wash. 98312

[21] Appl. No.: 09/118,864

[22] Filed: Jul. 20, 1998

[51] Int. Cl.[7] ................................ A62B 9/04; B62B 9/10

[52] U.S. Cl. ................................ 280/845; 280/17; 280/20

[58] Field of Search ................................ 280/845, 8, 19, 280/20, 17; 5/494, 625, 626, 627, 628

[56] References Cited

U.S. PATENT DOCUMENTS

| | | | |
|---|---|---|---|
| 2,309,464 | 1/1943 | Lucci et al. | 5/82 |
| 2,574,748 | 11/1951 | Meighan | 5/336 |
| 2,675,564 | 4/1954 | Hughes | 5/82 |
| 3,110,912 | 11/1963 | Propst | 5/82 |
| 3,372,944 | 3/1968 | Lauritzen | 280/17 |
| 3,602,221 | 8/1971 | Bleicken | 128/205.26 |
| 3,611,454 | 10/1971 | Klippel | 5/82 |
| 3,729,002 | 4/1973 | Miller | 128/205.26 |
| 4,234,982 | 11/1980 | Bez et al. | 5/702 |
| 4,736,474 | 4/1988 | Moran et al. | 5/627 |
| 5,050,254 | 9/1991 | Murphy | 5/625 |
| 5,193,235 | 3/1993 | Kircher | 5/413 R |
| 5,263,213 | 11/1993 | Robertson et al. | 5/627 |
| 5,481,770 | 1/1996 | Ahlsten | 5/625 |

*Primary Examiner*—Brian L. Johnson
*Assistant Examiner*—Bridget Avery
*Attorney, Agent, or Firm*—John P. Halvonik

[57] ABSTRACT

The invention is an inflatable evacuation/rescue sled for use in stabilizing the occupant initially followed by transport. The sled uses an inflatable cushion in connection with the sled. After the occupant has been transferred onto the backboard and stabilized in the sled the cushion is inflated by use of an air canister in connection with the sled. The sides at the mid-point have accordion inserts fashioned to facilitate ease of turning. The bottom of the sled includes two sided scales to further facilitate and control the travel of the sled.

3 Claims, 3 Drawing Sheets

INFLATABLE EVACUATION SHUTTLE

BACKGROUND OF THE INVENTION

1. Field of the Invention

The invention relates to the field of emergency evacuation/rescue devices and in particular, to an evacuation/rescue sled that inflates around the occupant/victim stabilizing them for transport whether they are on a bed, on a hillside or in a building. The sleds bottom surface (that which comes in contact with the field of travel) is covered with two sided scales which expose different surfaces depending on the direction the sled the sled is pulled. If pulled from the front/head using the front/head rope, the sled glides easily on an exposed slick bottom surface and when pulled from the bottom/tail end of the sled using the tail rope, the sled drags slowly on the exposed rubbery surface. The tail rope is the rope a rescuer would use to take the sled down a flight of stairs. The midsections of the sled have accordion pleats, FIG. 3 which do not inflate, constructed of a material, which will not snag or hook on protruding objects. The accordion pleats allow the sled to maneuver around tight corners, doorways, and stairwells with narrow landings, or any immovable objects.

2. Description of the Prior Art

While there are evacuation sleds in prior art, none of them are known to inflate around the occupant/victim stabilizing them to a backboard. Nor are there any known to use accordion pleat construction at the mid-sides of the sled in order to allow the sled to easily navigate tight turns and narrow confines. None of the prior art is able to show the use of two sided scales on the bottom surface of a sled that present either a rubbery or smooth bottom surface depending the direction from which the sled is pulled.

It is believed that using a sled, that has accordion pleated inserts at the mid-section of the sled, will allow the sled to be easily pulled around tight corners in buildings. The stereotypical design of a building does not allow for easy navigation of long rigid devices, like the standard gurney in use in rescue.

SUMMARY OF THE INVENTION

An inflatable evacuation/rescue sled with a back board foundation for use in stabilizing the occupant/victim initially followed by transport is shown and described. The backboard is the heart of the sled. Once the occupant/victim is secured to the backboard using the attached straps and closures, the sled is inflated and readied for transport. An Inflatable-surrounding cushion is held in close connection with the rigid backboard. After the patient has been secured to the backboard on the sled using an air canister in connection with the sled the cushion is inflated and the occupant/victim is surrounding by a cushion of air. Accordion inserts are used in connection with the mid-sides of the sled. The accordion inserts have a series of pleats running perpendicular to the plane of the backboard that allows the sides of the sled to bend in a direction at an angle of travel so that the sled can easily navigate turns and go around corners.

The bottom of the sled is covered with two sided scales which further facilitate travel. Handles are used in connection with the front (head) and back (tail) of the sled for use in pulling in either direction by one or more rescuers.

It is an objective of the invention to provide an inflatable evacuation/rescue sled for transport of accident victims and non-ambulatory patients so that the occupant can be transported during an emergency by sliding across floors, down stairs, or travel in difficult-to-navigate areas.

Another objective is to provide an inflatable evacuation/rescue sled for accident victims and non-ambulatory patients having an accordion pleating construction at the mid-point in order to allow the sled to bend at the middle and so allow the sled to navigate areas and make turns where there is little room to maneuver.

Another objective is to provide a safe and easy to use transport sled for accident victims and non-ambulatory patients that can easily navigate corner and make turns without additional undo stress being placed on the occupant of the sled.

Other advantages of the invention should be readily apparent to those skilled in the art once the invention has been described.

DESCRIPTION OF THE PREFERRED EMBODIMENT

Figure 1:
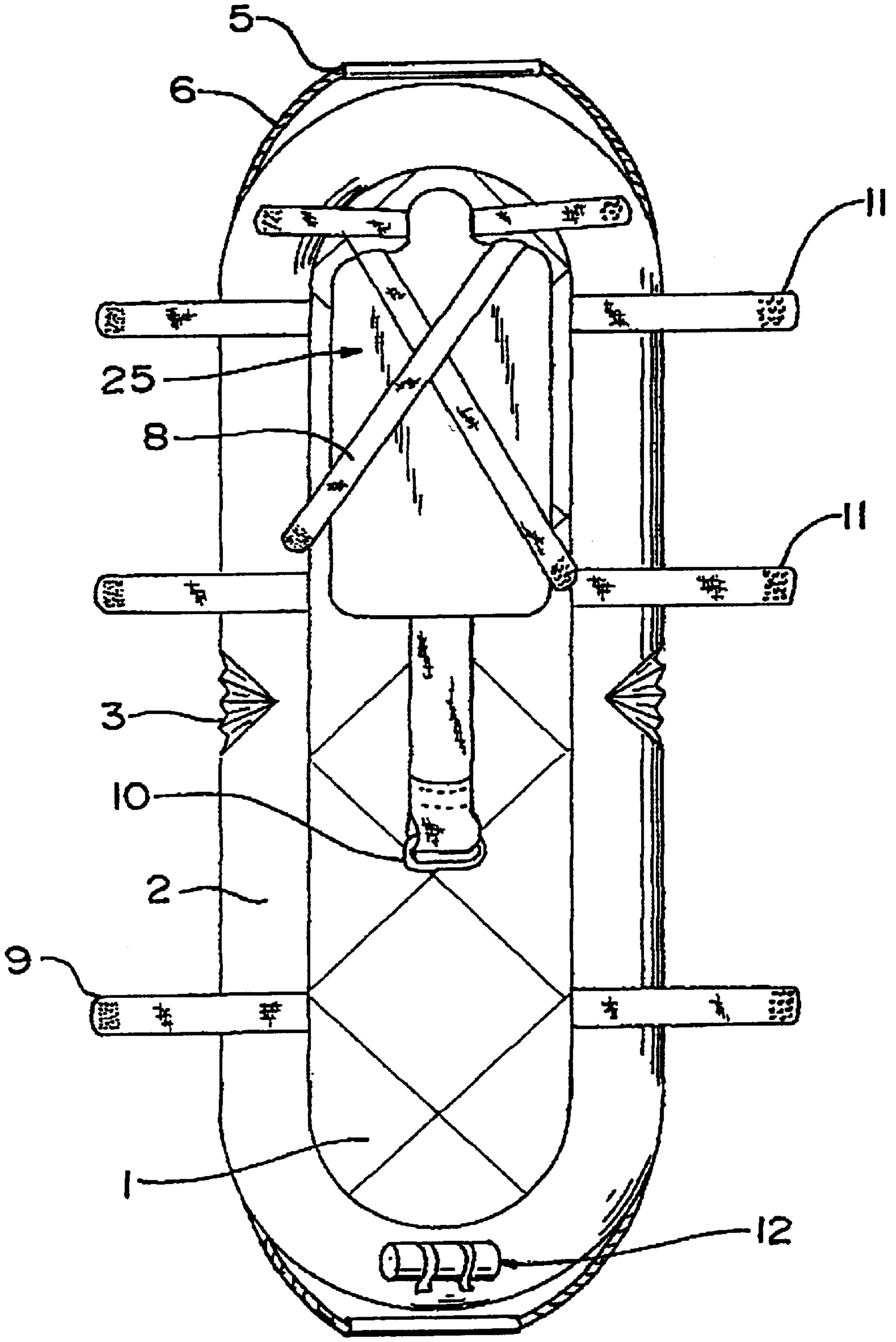
FIG. 1 Top of the sled

The construction of the sled is seen in the top view in FIG. 1. The sled may be constructed of a shape that is typical of a boat when seen in the top view. A base member 1 forms the foundation of the sled and an inflatable cushion 2 is used in connection with the base to form the outer walls of the sled. The cushion should surrounds the area where the backboard resides allowing the occupant to be accommodated upon the surface of the backboard and the base will then be raised above the ground or other surface that the sled is traveling upon.

An air canister 12 is in connection with the cushion and may be used to inflate the cushion after the occupant has been secured to the backboard. The canister may be connected to cushion(s) by means of a pipe or conduit 14 that may be located inside the cushion or in some other manner as design choice dictates. As the canister inflates, the cushion forms around the occupants body; thus stabilizing the patient even further.

In addition to the inflatable cushion, other stabilizing straps 8, 9 and 11 are located near where the head, trunk and foot of the occupant would be when placed in connection with the sled. Those pair of straps 8 may cross over one another to stabilize the torso area of the patient. Straps 9 would be where the legs of the patient would be and straps 11 also go around the torso and/or neck and shoulders of the patient. The straps may use VELCRO (trademark name for hook and loop mating materials) portions to connection with one another. Other means, e.g. buckles, etc. may be used to connect the straps to one another.

Figure 2:
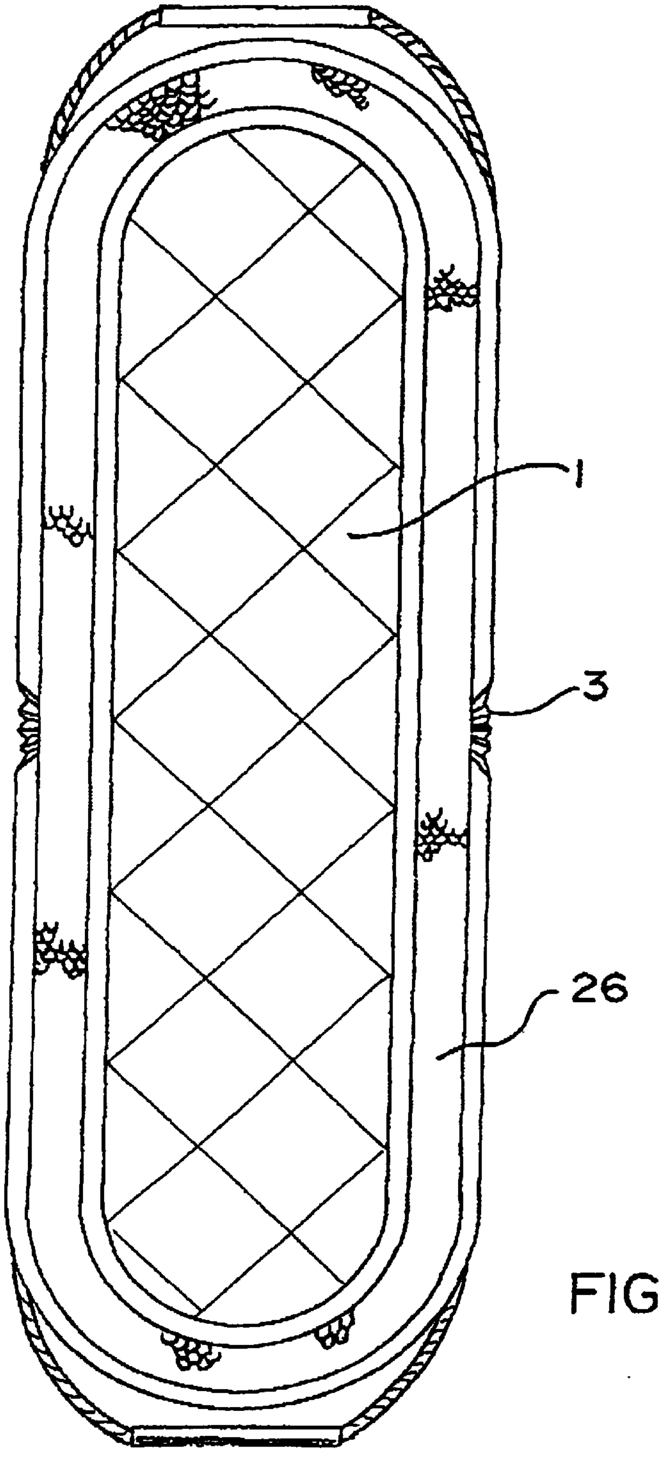
FIG. 2 Bottom of the sled
Figure 4:
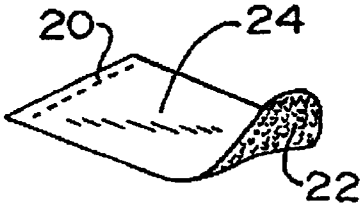
FIG. 4 view of scales used on underside of sled.
Figure 3:
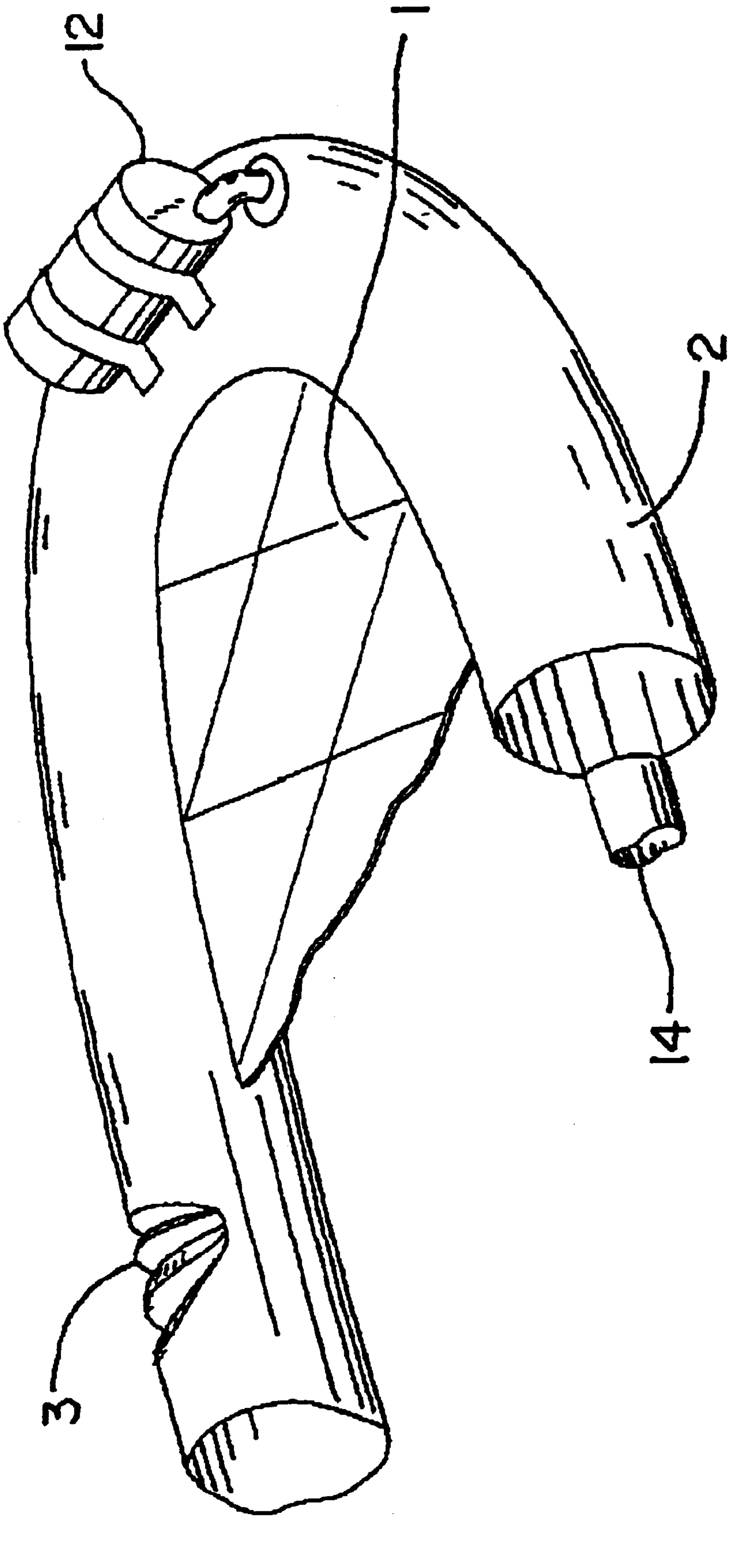
FIG. 3 cut away view of side of sled showing inflatable cushion.

Accordion pleats are shown as 3 in FIGS. 1 and 2. The pleats run perpendicular to the plane defined by the backboard but do not actually connect to the backboard 8. Each of the pleats is of planar construction and each set of pleats at one side of the sled is parallel to the other pleats. The cushion narrows at about the mid point of the sled and the pleats are used in this area. This narrowing serves to divide each side of the cushion into a front and a rear cushion for purposes of discussion.

One of the pleats will be in connection with the forward part of each cushion and another of the pleats will be in connection with the rear part of each cushion. With the use of the pleats, the structure of the sled can bend at the midpoint, i.e. the front either side of the cushion (left or right) can pivot or bend with respect to the rear portion of that side of the cushion. Each side of the cushion (left and right) can pivot independently of the other side. Thus, the sled can easily navigate around corners and other places with narrow confines.

A non-inflatable fabric may be connected to the deck 1 of the sled. The backboard 25 may be a piece separate from the deck and may be secured to the inflatable cushion that, surrounds it. The back board should be located at an appropriate point on the sled so as to properly function as a backboard, see FIG. 1.

Two sided scales, shown as 4 and are used in connection with the underside of the cushion 2 and should cover a portion of the bottom surface 26 of the cushion where it meets the field of travel, see FIG. 2. One surface 24 of each of the scales is smooth and will not hinder movement. The other surface 22 has a roughened texture and will slow movement down when that surface is exposed to the ground or other surface.

With that in mind, each of the scales should only be attached to the cushion at one edge 20 so that when the sled moves in one direction the smooth sides of all of the scales will contact the surface and when the sled travels in the other direction, the rough sides will be exposed and thus slow down travel in that direction. The scales should be attached so that all the smooth sides are exposed when travel is in one direction and tall the rough sides when travel in the other direction.

When the sled is pulled in one direction the smooth sides are exposed and when the sled is pulled in the other direction the scales roll forward exposing the roughened surface. This will slow down the speed of travel, for example, when the sled is used to go down a slope or stairs. In those cases, the sled would be pulled in the opposite direction and the roughened surfaces would slow down the movement of the sled. It is preferred that the scales be made of polyvinyl chloride (PVC) material. The scales may also be made of rubber or plastic or similar material that permits a roughened texture to be applied to one side of the material.

When transporting an occupant who has been secured in the sled the rescuer would pull in the direction necessary to facilitate travel. When descending stairs the roughened side of the scales would present themselves to the surface thus prohibiting the sled movement so the rescuer can control the speed at which the sled travels.

Velcro straps 8 are secured to the backboard, there may be one strap 10 near the crotch area of the patient and one each at the shoulders. These three straps meet at the chest, connect, fasten, and secure the occupant in place. At the head/front and bottom/tail of the sled there are additional straps 9 which further secure and stabilize the occupant.

Handles 4/5 are used in connection with both the head/front and the bottom/tail of the sled. Both handles are connected to the sled by use of a rope 6, cord, etc. The cord referenced will have limited expansion capabilities so that when the handle is released it cannot interfere with the travel of the sled. These handles may be used to pick the sled up and aid in the maneuvering of the craft when necessary.

I claim:

1. A portable evacuation/rescue sled comprising: a backboard member made of rigid material, a cushioning member able to be inflated, said cushioning member in connection with said backboard member of size and shape adapted for supporting an occupant that is laid upon said backboard and having securing straps for securing the occupant thereto, an inflation means in connection with said cushioning member for inflating said cushioning member, side walls in connection with said backboard and having an open section at about the mid point of each said side wall so as to form a pair of front and rear side walls, a series of at least two pleats in connection with said mid point of each said side wall, each of said pleats of planar construction and having an inner edge in connection with said side wall and having an outer edge not connected to said side wall, said pleats oriented in a manner parallel to one another so as to permit said front side wall to pivot in relation to said rear side wall.

2. The apparatus of claim 1 wherein said backboard is secured to the mid-section of said sled in a manner to suspend said backboard above the field of travel.

3. The apparatus of claim 2 wherein said inflated cushion having a top surface and a bottom surface, said bottom surface having a series of scales in connection therewith, each of said scales having at least two side edges and two surface, one of said surfaces of relatively smooth texture and the other of said surfaces of roughened texture sufficient to slow down the speed of said sled, each of said scales attached to said bottom surface along one of said edges so that when said sled is pulled in one direction along a surface said plurality of scales will expose said roughened surfaces to the surface and when said sled is pulled in the other direction said plurality of scales will expose said smooth surfaces to said surface.

* * * * *